United States Patent
Zamani et al.

(10) Patent No.: US 9,537,683 B1
(45) Date of Patent: Jan. 3, 2017

(54) METHOD AND APPARATUS FOR RESIDUAL PHASE NOISE COMPENSATION

(71) Applicants: Mahdi Zamani, Ottawa (CA); Hossein Najafi, Ottawa (CA); Demin Yao, Ottawa (CA); Jeebak Mitra, Ottawa (CA); Chuandong Li, Ottawa (CA); Zhuhong Zhang, Ottawa (CA)

(72) Inventors: Mahdi Zamani, Ottawa (CA); Hossein Najafi, Ottawa (CA); Demin Yao, Ottawa (CA); Jeebak Mitra, Ottawa (CA); Chuandong Li, Ottawa (CA); Zhuhong Zhang, Ottawa (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 14/876,246

(22) Filed: Oct. 6, 2015

(51) Int. Cl.
  H03D 1/00 (2006.01)
  H04L 27/06 (2006.01)
  H04L 25/03 (2006.01)
  H04L 27/26 (2006.01)

(52) U.S. Cl.
  CPC ... *H04L 25/03273* (2013.01); *H04L 25/03203* (2013.01); *H04L 27/2659* (2013.01)

(58) Field of Classification Search
  CPC .............. H04L 25/03273; H04L 25/03203; H04L 27/2659; H04L 27/0014; H04L 25/03006
  USPC ................ 375/326, 327, 340, 341, 233, 260
  See application file for complete search history.

(56) References Cited

U.S. PATENT DOCUMENTS

| | | | |
|---|---|---|---|
| 7,315,576 B1 * | 1/2008 | van Nee | H04L 25/03006 375/233 |
| 2007/0086533 A1 * | 4/2007 | Lindh | H04L 27/0014 375/260 |

OTHER PUBLICATIONS

E. Ip, et. al, "Feedforward carrier recovery for coherent optical communications," J. Lightw. Technol., vol. 25, No. 9, pp. 2675-2692, 2007.
T. Pfau, et. al, "Hardware-efficient coherent digital receiver concept with feedforward carrier recovery for M-QAM constellations," J. Lightw. Technol., vol. 27, No. 8, pp. 989-999, 2009.
X. Zhou, "An improved feed-forward carrier recovery algorithm for coherent receivers with M-QAM modulation format," Photon. Technol. Lett., vol. 22, No. 14, 2010.
X. Zhou, et. al, "Low-complexity, blind phase recovery for coherent receivers using QAM modulation," OFC/NFOEC Conf., vol. 27, paper OMJ3, 2011.
J. H. Ke, et. al, "Linewidth-tolerant and low-complexity two-stage carrier phase estimation for dual-polarization 16-QAM coherent optical fiber communications," J. Lightw. Technot, vol. 30, No. 24, pp. 3987-3992, 2012.

(Continued)

*Primary Examiner* — Phuong Phu
(74) *Attorney, Agent, or Firm* — Gowling WLG (Canada) LLP

(57) ABSTRACT

A method and apparatus for performing residual phase noise compensation is described. A coarse carrier compensation of a received modulated signal is performed to obtain a coarse carrier compensated signal and a trellis-based residual carrier recovery is performed to estimate a residual phase noise of the coarse carrier compensated signal. The coarse carrier compensated signal is compensated based on the estimated residual phase noise.

28 Claims, 14 Drawing Sheets

(56) References Cited

OTHER PUBLICATIONS

X. Zhou, et. al, "High spectral efficiency 400 Gb/s transmission using PDM time-domain hybrid 32-64 QAM and training-assisted carrier recovery," J. Lightw. Technol., vol. 31, No. 7, pp. 999-1005, 2013.

A. J. Viterbi, "Error bounds for convolution codes and an asymptotically optimum decoding algorithm," Trans. Inform. Theory, vol. IT-13, No. 2, pp. 260-269, Apr. 1967.

L. Barletta, et. al, "Pilot-aided trellis-based demodulation," Photon. Technol. Lett., vol. 25, No. 13, 2013.

D. Marsella, et. al, "Maximum likelihood sequence detection for mitigating nonlinear effects," J. Lightw. Technol., vol. 32, No. 5, pp. 908-916, 2014.

G. Bosco, et. al, "MLSE-based DQPSK transmission in 43 Gb/s DWDM long-haul dispersion-managed optical systems," J. Lightw. Technol., vol. 28, No. 10, pp. 1573-1581, 2010.

A. J. Viterbi, et al, "Non-linear estimation of PSK-modulated carrier phase with application to burst digital transmission," Trans. Inform. Theory, vol. IT-29, No. 4, pp. 543-551, Jul. 1983.

\* cited by examiner

METHOD AND APPARATUS FOR RESIDUAL PHASE NOISE COMPENSATION

TECHNICAL FIELD

The present disclosure relates to residual phase noise compensation, and more particularly, to a method and apparatus for residual phase noise compensation.

BACKGROUND

Communication systems may face several channel impairments and component impairments through the transmission links. These impairments may be compensated digitally in the digital signal processing (DSP) units of the receivers or transceivers.

Several methods for carrier recovery (CR) have been proposed. However, there is a need for an improved method and apparatus for residual phase noise compensation.

SUMMARY

The following presents a summary of some aspects or embodiments of the disclosure in order to provide a basic understanding of the disclosure. This summary is not an extensive overview of the disclosure. It is not intended to identify key or critical elements of the disclosure or to delineate the scope of the disclosure. Its sole purpose is to present some embodiments of the disclosure in a simplified form as a prelude to the more detailed description that is presented later.

In one embodiment of the present disclosure, a method of residual carrier recovery of a received modulated signal is described. According to the method, a coarse carrier compensation of the received modulated signal is performed to obtain a coarse carrier compensated signal; a trellis-based residual carrier recovery is performed to estimate a residual phase noise of the coarse carrier compensated signal; and the coarse carrier compensated signal is compensated based on the estimated residual phase noise.

In another embodiment of the present disclosure, a digital signal processing apparatus is described. The digital signal processing apparatus comprises a coarse carrier recovery module for performing a coarse carrier compensation of a received modulated signal; and a trellis-based processing module for estimating and compensating a residual phase noise of the received modulated signal.

BRIEF DESCRIPTION OF THE DRAWINGS

These and other features of the disclosure will become more apparent from the description in which reference is made to the following appended drawings.

DETAILED DESCRIPTION

The following detailed description contains, for the purposes of explanation, various illustrative embodiments, implementations, examples and specific details in order to provide a thorough understanding of the invention. It is apparent, however, that the disclosed embodiments may be practiced, in some instances, without these specific details or with an equivalent arrangement. The description should in no way be limited to the illustrative implementations, drawings, and techniques illustrated below, including the designs and implementations illustrated and described herein, but may be modified within the scope of the appended claims along with their full scope of equivalents.

Disclosed herein are methods and apparatuses for residual phase noise compensation, alternatively referred to as residual carrier recovery, or fine carrier recovery.

Although the following description makes reference to optical systems and particularly coherent optical systems, it should be understood that the described methods and apparatuses are generally applicable to any communication systems. For the purpose of this disclosure, the expression "digital signal processing apparatus" is used to encompass all digital signal processors, digital signal processing devices, circuits, implementations, units, modules, means, whether implemented in hardware, software and/or firmware. A digital signal processing apparatus may comprise an application specific integrated circuit (ASIC), a field-programmable gate array (FPGA), or can be an off-the-shelf DSP chip. In accordance with some embodiments of the description, the digital processing apparatus is an optical transceiver.

The digital processing apparatus includes a coarse carrier recovery module for performing a coarse carrier recovery or compensation of a received modulated signal, and a trellis-based processing module for estimating and compensating a residual phase noise of the received modulated signal.

Figure 1:
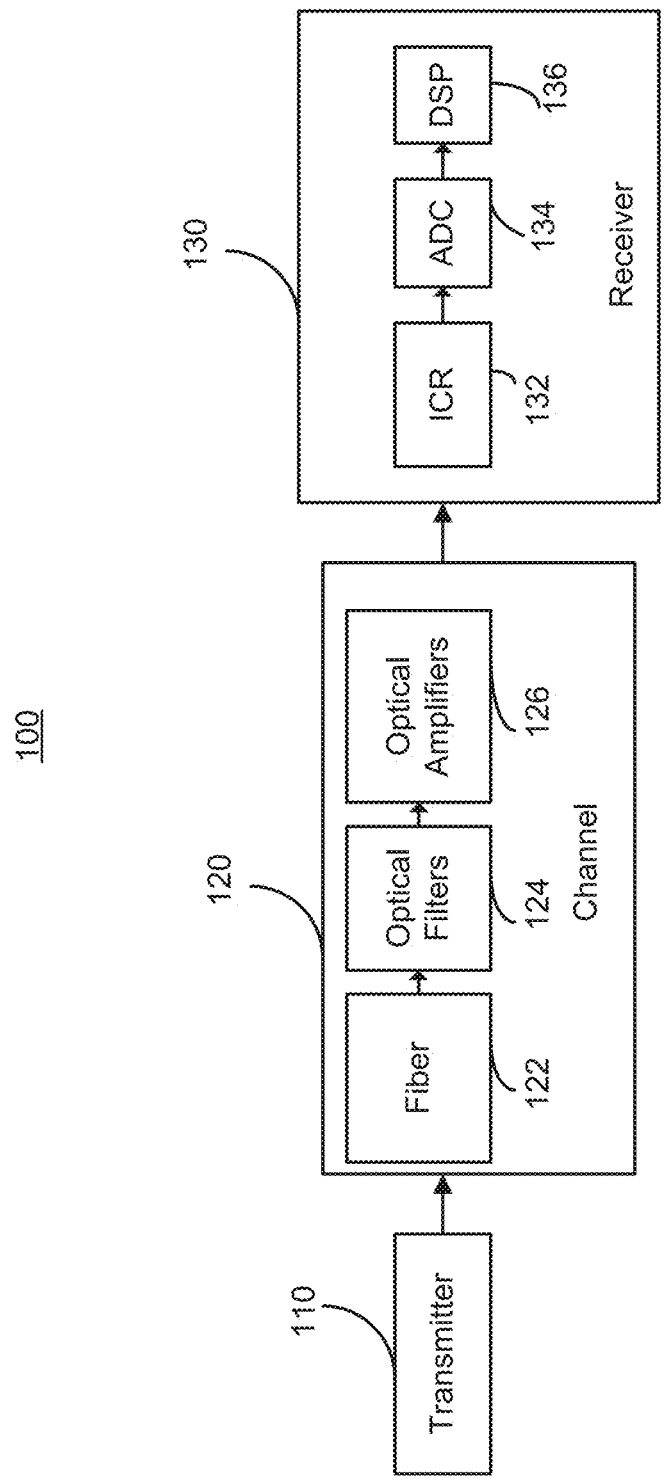
FIG. 1 is a schematic diagram of a coherent optical communication system.

A schematic diagram of a coherent optical communication system 100 is shown in FIG. 1, to which the described method and apparatus is applicable. The transportation link 100 comprises a transmitter 110, a channel 120, and a receiver 130 arranged as illustrated in FIG. 1.

An example of a transmitted signal from the transmitter 110 may be formatted as two orthogonal linear polarization components (X and Y polarizations), wherein each component may comprise two orthogonal phase components (an in-phase component I and a quadrature-phase component Q). The four components have the same carrier frequency which is determined by an optical wavelength supplied by a laser. The laser may also contribute phase noise to the transmitted signal. The transmitted signal is modulated, by a modulator such as an 8, 16, 32, or 64 quadrature amplitude modulator (QAM), a Quadrature Phase Shift Keying (QPSK) modulator, or a modulator with 4 or 8 dimension modulation formats.

The channel 120 transports the modulated signal from the transmitter 110 to the receiver 130, and may have one or more fibers 122, optical filters 124 and optical amplifiers 126. The channel 120 may also comprise one or more cascaded wavelength-selective switches (WSSs). The components of the channel 120 may introduce impairments, such as chromatic dispersion (CD), nonlinear phase noise, polarization mode dispersion (PMD), polarization dependent loss (PDL) and/or gain, state-of-polarization (SOP) rotation, white Gaussian noise, or combinations thereof.

The receiver 130 is configured to receive the modulated signal. The receiver 130 can include an integrated coherent receiver (ICR) 132, an analog-to-digital converter (ADC) 134 coupled to the ICR 132, and a DSP unit 136 coupled to the ADC 134. The ICR 132 receives the modulated signal and generates one or more signal outputs. The ICR 132 may include a local oscillator (LO) (not shown) which generates an optical signal having a carrier frequency that is the same or about the same as that of the received modulated signal. The optical signal generated by the LO is mixed with the received modulated signal and the resultant signal is split into four components (i.e. two polarization components X and Y, each polarization component including an in-phase component I and a quadrature-phase component Q). The output signals from the ICR 132 may then be converted by an ADC 134 from analog to digital domain and forwarded to the DSP unit 136, which processes the signals and recovers the data in the transmitted modulated signal.

In the receiver 130, the DSP unit 136 can be configured to digitally compensate various impairments. Examples of the impairments include, but are not limited to, CD, PMD, PDL, SOP rotations, laser phase noise, jitter, frequency offset, I-Q delay, X-Y delay, and I-Q imbalance.

To compensate for the various impairments noted above, the DSP unit 136 can include a single equalization module, or separate equalizer modules for compensating specific impairments.

Figure 2:
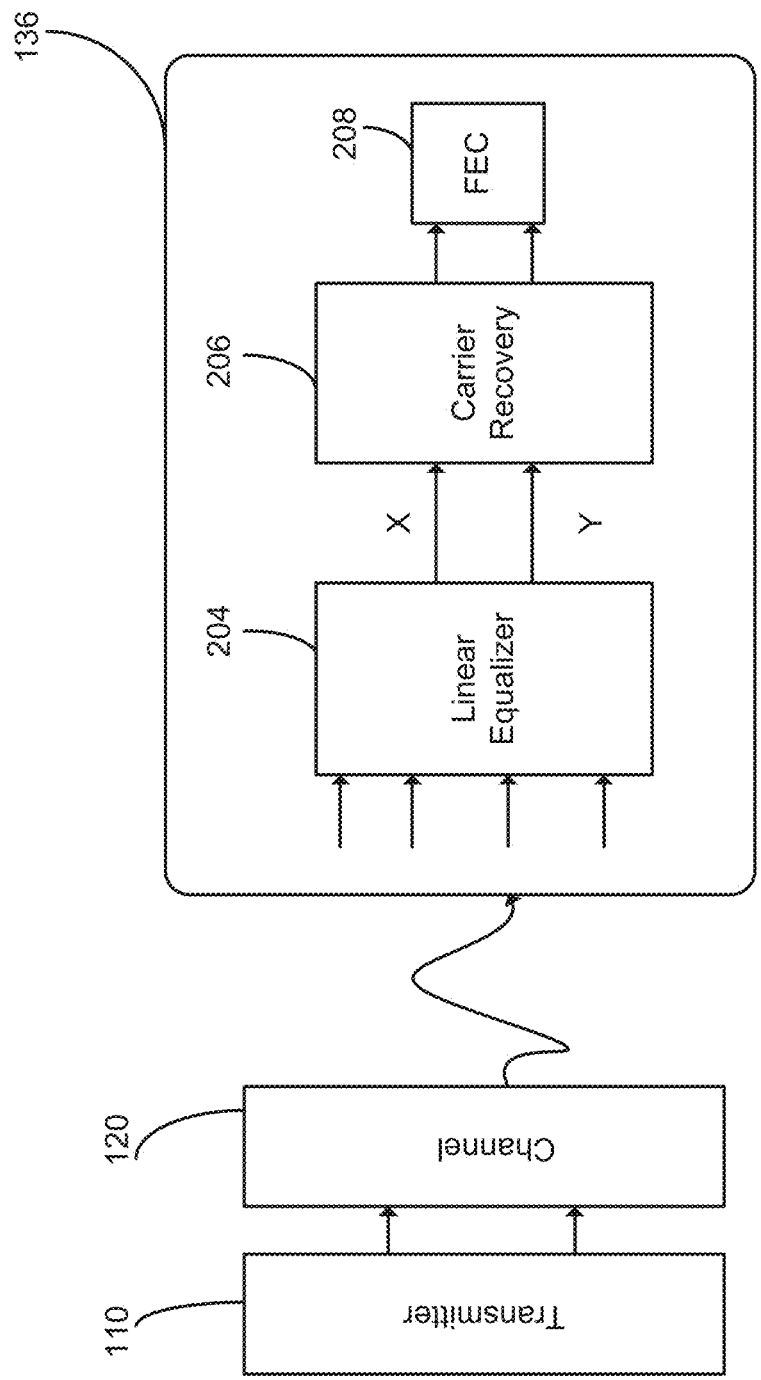
FIG. 2 is a schematic diagram of an optical DSP in a coherent optical communication system.

FIG. 2 is a schematic diagram of a DSP unit 136 used in a coherent optical receiver or transceiver. The DSP unit 136 includes a linear equalizer 204. The linear equalizer 204 can include a frequency-domain equalizer (FDEQ), a time-domain equalizer (TDEQ), or both. The FDEQ can address quasi-deterministic impairments, such as CD and matched filtering; and the TDEQ can address polarization dependent impairments, such as SOP, PDL and PMD. The TDEQ may be realized by way of, for example, an adaptive time-domain butterfly structure, e.g., a multiple-input multiple-output finite impulse response (MIMO-FIR) circuit. The linear equalizer 204 may be implemented as one single module or a plurality of modules. For example, the equalizer may include a module for FDEQ and a separate module for TDEQ, and either the FDEQ or the TDEQ may be omitted in some embodiments.

The DSP unit 136 includes a carrier recovery (CR) module 206 for estimating and compensating the phase noise of the received modulated signal. The output of the CR module 206 is provided to a forward error correction (FEC) decoder 208.

Phase-lock looped (PLL) based CR methods have limited performance due to their phase noise bandwidths and/or their phase estimation ability, particularly in cases where the communication systems have high frequency phase noises caused by reasons including, but not limited to, fiber non-linearity, large laser line-width.

According to one embodiment of the disclosure, a trellis-based processing method and module is described to estimate and compensate a residual phase noise of the received modulated signal. The trellis-based processing module is coupled to a coarse carrier recovery module and can be configured to provide the estimated residual phase noise using the Viterbi or Bahl-Cocke-Jelinek-Raviv (BCJR) algorithm. In the following description, the trellis-based processing module is referred to as a trellis-based carrier recovery (TCR) module.

Figure 3:
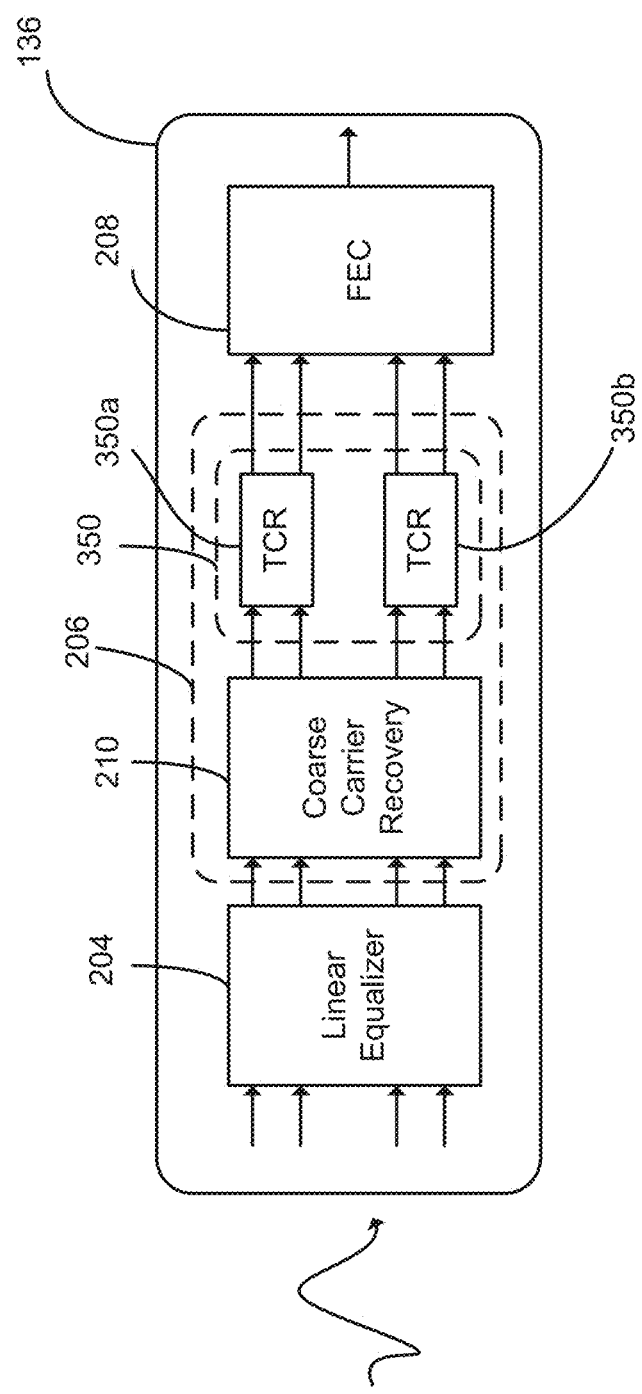
FIG. 3 is a schematic diagram of an embodiment of an optical DSP including a trellis-based carrier recovery (TCR) module.

FIG. 3 is a schematic diagram of an embodiment of the DSP unit 136, including a TCR module. As illustrated in FIG. 3, the CR module 206 includes a coarse carrier recovery module 210 for performing a coarse carrier recovery or compensation of the received modulated signal, and a TCR module 350 for estimating and compensating a residual phase noise of the received modulated signal. The TCR module and the TCR processing method can operate on symbol-rate data. In a coherent optical system as illustrated in FIG. 3, a TCR module 350 can include two TCR sub-modules 350a, 350b configured to estimate the residual phase noise of each polarization of the received optical signal separately. It should be understood that such a dual-sub-module configuration may not be necessary in a single-polarization coherent optical communication system or in other communication systems.

The coarse carrier recovery module 210 may include a feed-back carrier recovery (FBCR) module, or a feed-forward carrier recovery (FFCR) module, or both modules. The FBCR module may be implemented based on a $2^{nd}$ order decision-directed PLL (DD-PLL). In high-speed DSP structures, a parallel design of DD-PLLs with delay of several symbols may be considered. The FFCR module may correct the phase error using for example, a fourth-power circuit, maximum-likelihood (ML)-based phase estimation, or a blind phase search (BPS) algorithm. Multiple FFCRs may be cascaded for improved performance. Alternatively, a parallel structure of multiple FFCRs may be implemented. Using the FFCR in conjunction with the FBCR can improve the phase noise bandwidth tolerance of the system.

The TCR module 350 utilizes a trellis that is constructed on the residual phase noise of the received modulated signal. According to an embodiment of the disclosure, a trellis is constructed which includes L trellis stages and M states corresponding to M possible values of the residual phase noise of a symbol. The trellis is navigated through the L trellis stages to trace a most likely value of the residual phase noise using a Viterbi or BCJR algorithm. Although the following description is described with reference to the Viterbi algorithm, it should be understood that the BCJR algorithm can be used as an alternative.

Because phase noise is a continuous random variable, the residual phase noise to be estimated can be quantized to K discrete values in order to be digitally processed in the TCR module 350. The value of the residual phase noise can be confined within a range of $[\phi_{min} \sim \phi_{max}]$ to limit the number of states in the trellis.

Figure 4:
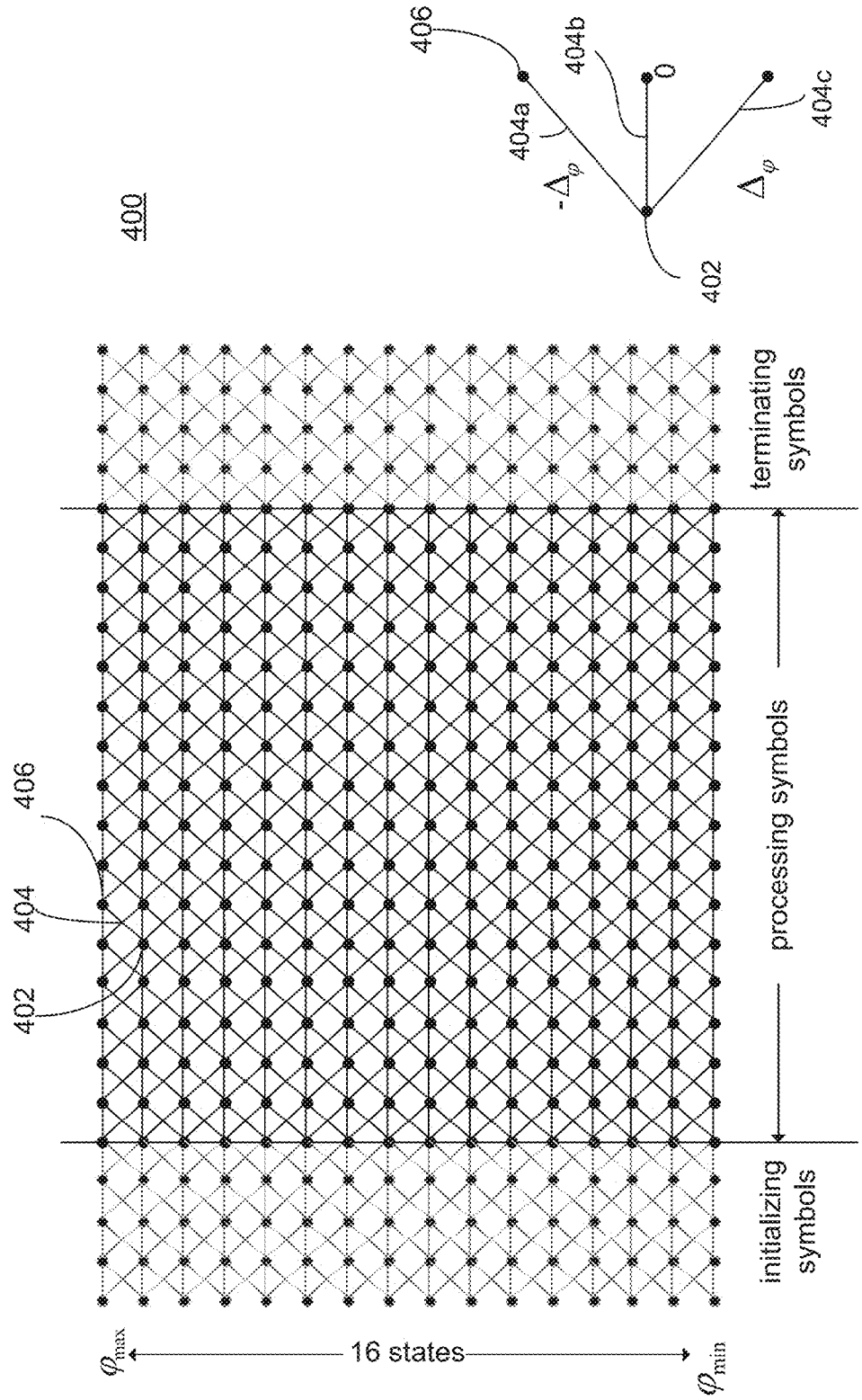
FIG. 4A illustrates an example of a trellis.
FIG. 4B illustrates an example of possible branches from a state in the trellis.

FIG. 4A illustrates an example of the trellis 400 according to an embodiment of the description. Each state 402 of the trellis 400 represents a possible value of the residual phase noise of a symbol at a time slot. The possible value of the residual phase noise represented by the state can be referred to simply as the residual phase noise state. From each state 402 there can be at most K branches 404. Each branch 404 connects from a source state 402 to a destination state 406 and represents a possible phase noise jump for the symbol at the time slot, or alternatively, for the symbol in the trellis stage. The phase noise jump corresponding to the branch 404 can be referred to simply as the phase jump.

In the case when the residual phase states have uniformly distributed values, the total number of states M satisfies $M=1+(\phi_{max}-\phi_{min})/\Delta_\phi$, where $\Delta_\phi$ is a minimum absolute value of a phase jump. In the example illustrated in FIG. 4A, K=3, M=16. FIG. 4A also shows that the TCR module 350 may use a number of symbols for initialization of the trellis 400, and/or a number of symbols for termination of the trellis 400. Although some embodiments show the processing symbols in the same number as the trellis stages, it should be understood that the number of the trellis stages can be made smaller than the number of the processing symbols.

FIG. 4B illustrates an example of possible branches 404a, 404b, 404c from a state 402 in the trellis 400. In this example, there are three possible phase jump values, namely, $-\Delta_\phi$, 0, $\Delta_\phi$. The three possible branches 404a, 404b, 404c represent a three-level phase jump quantization. Although the phase state have uniformly distributed values in the example shown in FIG. 4B, it should be noted that the phase states may not have uniformly distributed values in other implementations. For example, the trellis 400 may be constructed by having arctan values of the phase states distributed uniformly.

To perform trellis decoding using the trellis 400, branch metrics are calculated. For each state in the trellis 400, the output of the coarse carrier recovery module 210 is phase-rotated according to the phase state. The phase-rotated output of the coarse carrier recovery module 210 is mapped to a constellation point (e.g., the closest constellation point) in a modulation constellation, the modulation constellation being the constellation based on which the received signal is modulated. Thereafter, a branch metric is calculated based on a normalized Euclidean distance between the phase-rotated output of the coarse carrier recovery module 210 and the mapped constellation point, as well as a probability of the phase jump.

Mathematically, the branch metric can be expressed as:

$$m[l, k, n] = \frac{|R[n]e^{j\varphi_k} - \hat{s}[n]|^2}{\sigma_N^2} + \frac{|\varphi_k - \varphi_l|^2}{2\sigma_\Delta^2}, \quad (1)$$
$$(l = 1, \ldots, K, K = 1, \ldots, M, n = 1, \ldots, L)$$

where R[n] is symbol of the received modulated signal at time slot n (or in trellis stage n), $\phi_k$ is the phase state of state k, $\phi_l$ is the phase state of a source state connected to state k by a branch l, and ŝ[n] is the constellation point mapped to $R[n]e^{j\Phi_k}$ in the modulation constellation.

The first term in equation (1) represents the normalized Euclidean distance between the phase-rotated signal and the mapped constellation point, and may be referred to as the distance metric d[k,n], or simply $d_n$. The second term in equation (1) represents the probability of the phase jump represented by the branch l. $\sigma_N$ is the standard deviation of the additive white Gaussian noise (e.g., ASE noise) and $\sigma_\Delta$ is the standard deviation of the residual phase noise. For example, in the example shown in FIG. 4B, the second term in the branch metric is 0 for a branch corresponding to a 0 degree phase jump, and equals $$\frac{\Delta_\varphi^2}{2\sigma_\Delta^2}$$

for a branch corresponding to a $\pm\Delta_\phi$ radian phase jump.

Based on the calculated branch metrics, state metrics can be calculated recursively using a Viterbi algorithm.

Mathematically, the state metric in the Viterbi algorithm can be expressed as:

$$\alpha[k,n]=\min_{l=1,\ldots,K}\{\alpha[l,n-1]+m[l,k,n]\}. \quad (2)$$

That is, a state metric α[k, n] of a destination state k at a time slot n (or in trellis stage n) is calculated by obtaining a minimum sum of the branch metric m[l, k, n] and the state metric α[l, n−1] The branch metric m[l, k, n] represents the branch metric of branch l connected to the destination state k at a time slot n (or in trellis stage n); and the state metric α[l, n−1] represents the state metric of the source state of the branch l at a previous time slot n−1 (or in a previous trellis stage n−1). The minimization is taken across all branches l=1, . . . , K connected to the destination state k. The branch that provides the minimum value in equation (2) is a survived branch and the minimum sum α[k, n] is used as a state metric in a state metric calculation of a next trellis stage n+1. A survived branch for each state may be buffered and used to construct a survived path in trace back.

According to the Viterbi algorithm, the trellis is navigated from the first trellis stage to the $L^{th}$ trellis stage. The state metrics α[k, n] are calculated recursively based on equation (2). Only the state metrics and the survived branches that provide the minimum values in equation (2) are kept. At the $L^{th}$ symbol (i.e., the $L^{th}$ time slot or $L^{th}$ trellis stage) after the current decoding symbol, where L may also be referred to as a trace back length of the trellis 400, a state having a minimum state metric α[k, n] is determined. The determined state in the $L^{th}$ trellis stage is used as a beginning state to trace back the survived path. In particular, the survived branches that lead to the minimum value are located and these survived branches collectively form the survived path which is the most probable path of the trellis 400. The survived path is used for estimating the most likely residual phase noise, and the received modulated signal can be compensated with delay based on the estimated most likely residual phase noise. As will be explained in more detail below, one or more higher order most probable paths of the trellis 400 may also be traced. The second or higher order most probable path may be traced back from a state having a second or higher order minimum state metric in the $L^{th}$ trellis stage. The second or higher order most probable path can be referred to as the competitive path.

Figure 5:
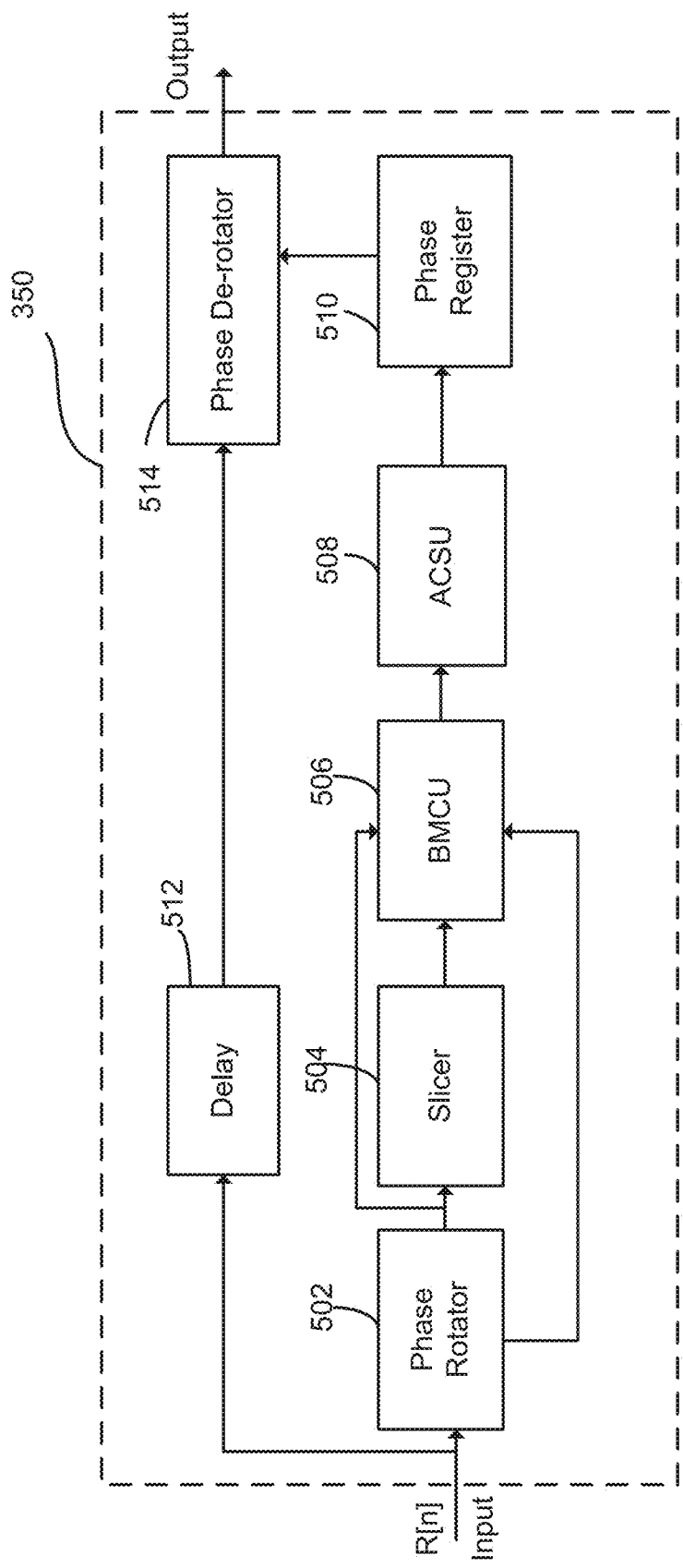
FIG. 5 is a schematic diagram of an embodiment of the TCR module.

FIG. 5 is a schematic diagram of an embodiment of the TCR module 350 implementing the above method. As shown in FIG. 5, the phase of the symbol in trellis stage n is rotated according to each phase state by phase rotator 502. The phase rotator 502 may be implemented using a known CORDIC circuit or by any other suitable method. The closest constellation point to this phase-rotated signal can be mapped, for example, by a slicer 504. The slicer 504 may be implemented as a look-up-table (LUT) or by any other suitable methods. The branch metrics are then calculated in a branch metric calculation unit (BMCU) 506. Each branch metric is calculated based on the phase-rotated signal, the closest constellation point, and the phase jump represented by the branch, according to equation (1). Thereafter, the survived path of the trellis 400 is traced in an add-compare-select unit (ACSU) 508. The state metrics are calculated recursively according to equation (2). In trellis stage L, the survived path in the trellis 400 is identified, and based on the survived path the estimated residual phase noise is determined and registered in the phase register 510. Finally, the signal is buffered in a delay 512 to be compensated by the phase de-rotator 514 based on the estimated residual phase noise. Although the BMCU 506 is shown to be upstream to ACSU 508 in the embodiment illustrated in FIG. 5, it should be noted that the branch metrics can be calculated on-the-fly in the trellis decoding, as will be explained below.

Some communication systems, such as coherent optical systems, can operate with ultra-high baud rates in the scale of tens of gigahertz. For example, the received signal in a coherent optical system may have a baud rate of 25 Ghz to 66 Ghz. To realize the TCR processing in such high baud rate systems, the DSP unit 136 may use a parallel structure for the TCR modules 350. In particular, an output frame of the linear equalizer 204 and the coarse carrier recovery module 206 with a symbol length of F may be divided into P parallel blocks. Each of these blocks with a symbol length F/P is processed in one of the P parallel TCR modules 350. The discontinuity of data by dividing the symbol sequence into parallel blocks may cause vague initial state metrics at each parallel TCR module 350. To address this issue, at the $p^{th}$ parallel TCR module 350, an initial sequence of the last S symbols of the $(p-1)^{th}$ block may be processed before the F/P symbols of the $p^{th}$ block, where S is less than F/P. It is noted that the TCR module 350 only compensates the residual phase noise of its own sequence with symbol length F/P, and the S symbols are only used for initialization of the TCR module 350. As noted above, the trace back length L can be the same or smaller than the symbol length F/P.

Figure 6:
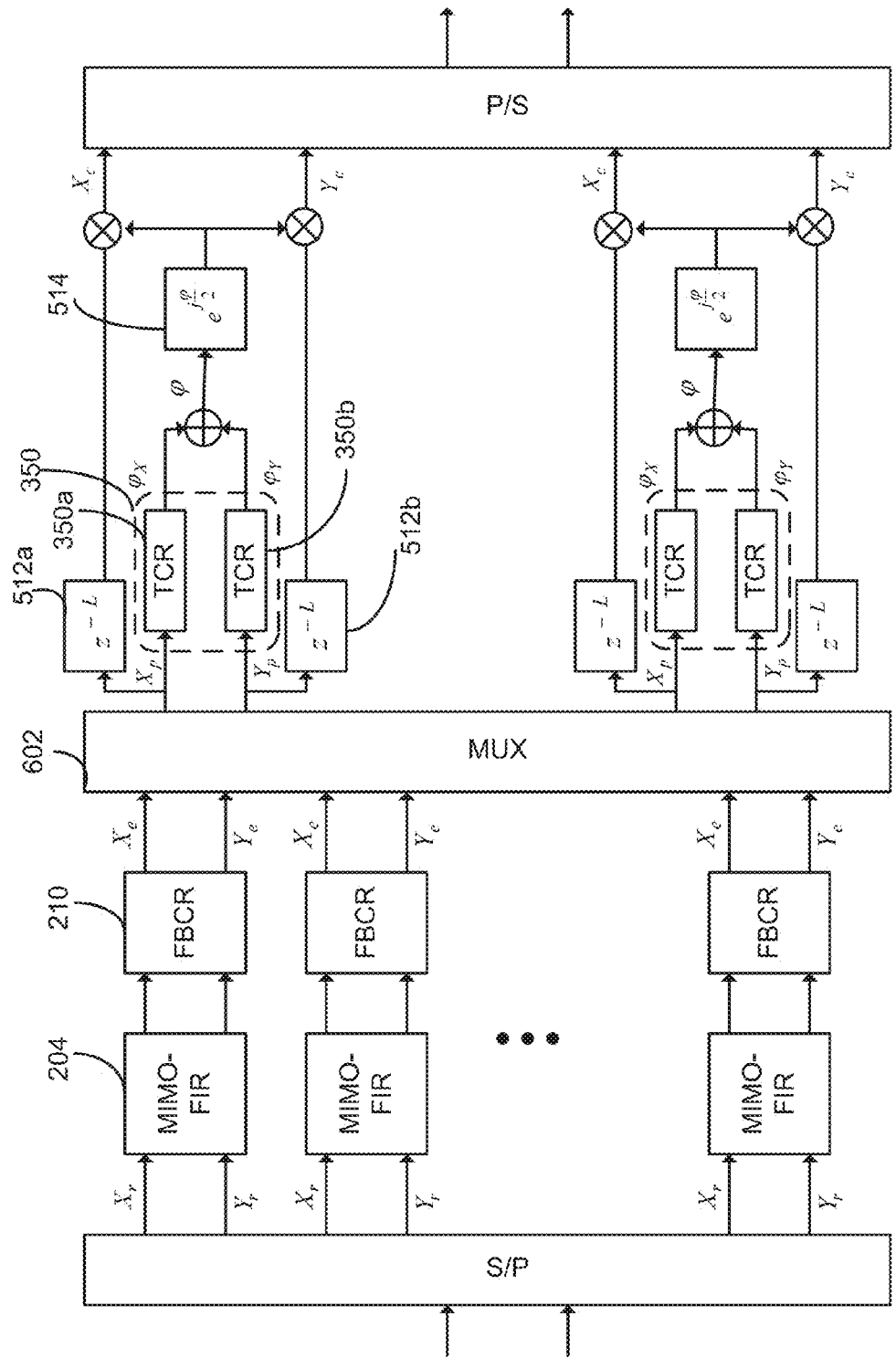
FIG. 6 is a schematic diagram of an embodiment of a parallel structure of the TCR modules.

FIG. 6 is a schematic diagram of an embodiment of a parallel structure of the TCR modules 350. As illustrated in FIG. 6, a parallel structure, similar to the structure of a MIMO-FIR module 204 in high-speed optical modems, may be implemented to keep the same throughput of data. The MIMO-FIR 204 performs a linear equalization to the received signals $X_r$, $Y_r$, and a FBCR module 210 performs a coarse carrier recovery of the equalized signals to obtain coarse carrier compensated signals $X_e$, $Y_e$. The coarse carrier compensated signals $X_e$, $Y_e$ are then multiplexed by a MUX 602 into a plurality of parallel TCR modules 350. For each parallel TCR module 350, the phase of the coarse carrier compensated signals is compensated by the phase de-rotator 514 with a delay of L symbols provided by the delay 512a, 512b, where L is the trace back length of the TCR sub-module 350a, 350b.

It should be noted that although in the embodiment shown in FIG. 6, a MIMO-FIR module is used for the linear equalizer 204, and a FBCR module is used for the coarse carrier recovery module 210, other suitable modules can be used, as described above. As well, although the delay 512a, 512b and the phase de-rotator 514 are shown outside the TCR module 350 for illustration purposes, the delay 512a, 512b and the phase de-rotator 514 can be implemented within the TCR module 350. In polarization-division multiplexed (PDM) systems, the TCR module 350 may include a dual-sub-module implementation 350a, 350b for obtaining the estimated residual phase noises of two polarizations separately. In the embodiment illustrated in FIG. 6, the estimated residual phase noises of two polarizations are averaged, and then applied to the two polarizations in the same manner. However, it should be understood that the estimated residual phase noises of two polarizations may not be averaged and may be compensated separately for each polarization. As noted above, a dual-sub-module configuration is not necessary in a single-polarization coherent optical communication system or in other communication systems.

It should further be noted that while the various parameters of the TCR module 350 are described above with reference to specific implementations, these specific implementations are not meant to be limiting and other suitable parameters may be used. Such parameters include, but are not limited to, the number of states M in the trellis 400, the minimum residual phase jumps $\Delta_\varphi$, the number of branches K from each state, the trace back length L, the number of parallel TCR modules P, the number of initialization trellis stages, and the number of termination trellis stages. In many applications, appropriate values for $\sigma_N$ and $\sigma_\Delta$ in equation (1) may be determined through simulations.

According to one embodiment, the normalized Euclidean distance may be averaged across a plurality of neighboring symbols, in order to smooth the branch metric values and to make the algorithm more resilient to undesired phase jumps at the output of the coarse carrier recovery module 210. For example, the branch metric of the equation (1) may be modified by taking into consideration the distance metrics of a previous symbol and a next symbol in each trellis stage. Accordingly, an enhanced branch metric can be obtained by modifying the distance metric d[k, n] in the equation (1) to be a distance metric averaged across d[k, n−1], d[k, n], and d[k, n+1] For the purpose of this description, the term "average" is used broadly to also encompass a weighted average. Although in this particular example, the number of neighboring symbols taken into consideration in each branch metric calculation is three, it should be understood that any other suitable number of neighboring symbols can be used for branch metric smoothing.

According to another embodiment, the TCR module 350 may implement a super-symbol based TCR processing. In such an embodiment, the plurality of symbols in the received modulated signal are grouped into a plurality of super-symbols, each super-symbol being constructed of a group of N consecutive symbols. The same phase compensation is performed to the N consecutive symbols that make up the super-symbol. Each state of the trellis represents a possible residual phase noise of a super-symbol. A residual carrier recovery is carried out to estimate a residual phase noise for each of the super-symbols, and the estimated residual phase noise of each super-symbol is used as a common estimated residual phase noise for each of the consecutive symbols making up the super-symbol. Because the trace back length L of a TCR module 350 is limited due to hardware requirements, the super-symbol based TCR processing can effectively increase the trace back length by N times. The super-symbol based TCR processing can also reduce hardware resources because the number of parallel processors required to process a given frame is reduced.

For super-symbol based TCR processing, the branch metric can be obtained by replacing the distance metric d[k, n] in equation (1) with D[k, n], where D[k,n] is an average of the Euclidean distances between the phase-rotated coarse carrier compensated signal of each of the N symbols making up the super-symbol and a corresponding constellation point, e.g., d[k, j], . . . , d[k, j+N−1]. Thereafter, a common estimated residual phase noise is used to compensate each of the N consecutive symbols making up the super-symbol.

Figure 7:
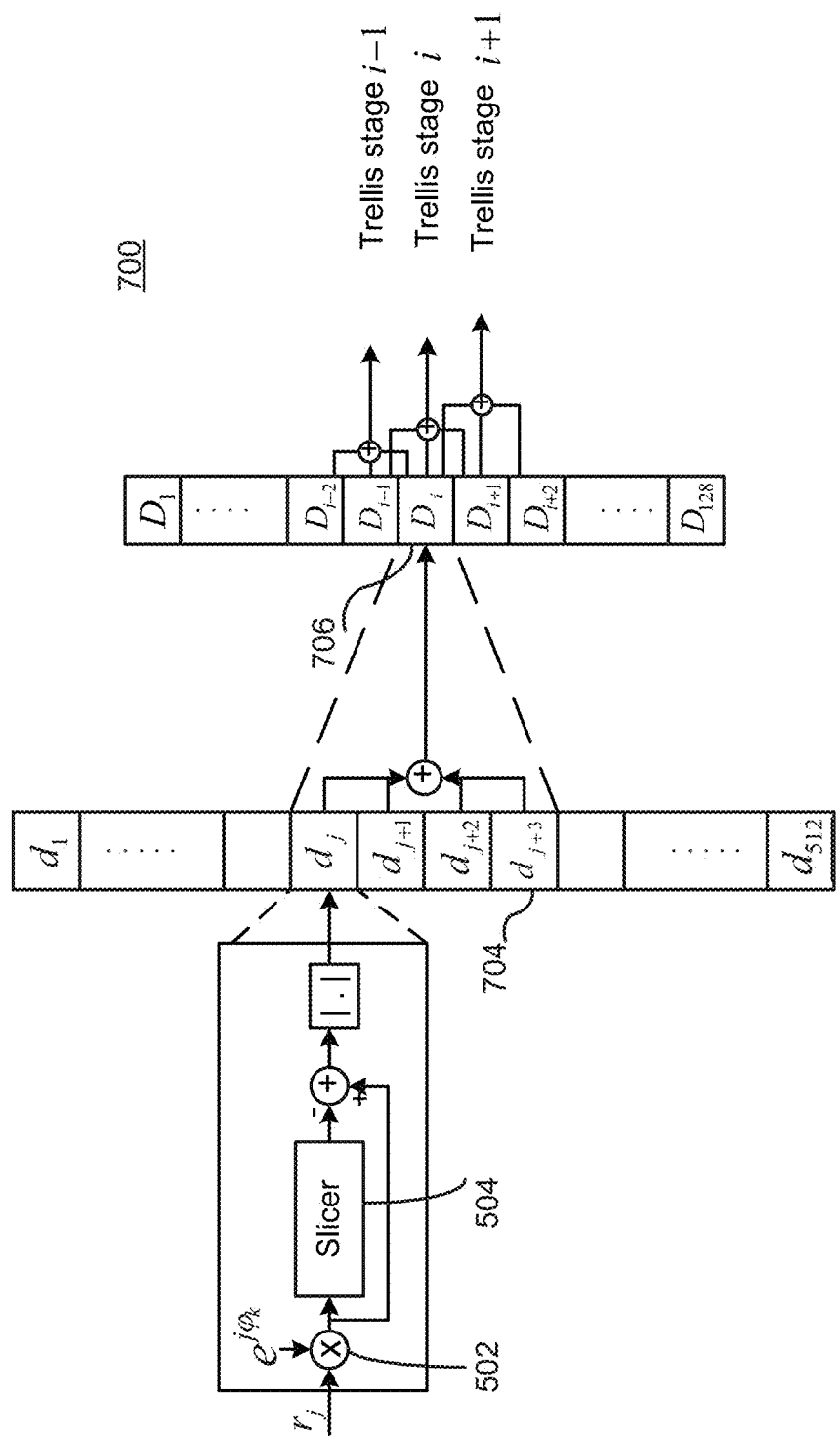
FIG. 7 is a schematic diagram of an embodiment of an enhanced branch metric calculation of the TCR module.

FIG. 7 is a schematic diagram of an embodiment of an enhanced branch metric calculation implementing the above described branch metric smoothing and super-symbol based TCR processing. In the BMCU 700 as shown in FIG. 7, distance metrics $d_j$, $d_{j+1}$, $d_{j+2}$ and $d_{j+3}$ 704 for consecutive symbols $s_j$, $s_{j+1}$, $s_{j+2}$, $s_{j+3}$ are obtained using the above described phase rotator 502 and slicer 504. The obtained distance metrics $d_j$, $d_{j+1}$, $d_{j+2}$ and $d_{j+3}$ 704 are then averaged to calculate a distance metric $D_i$ 706 of a super-symbol $S_i$ corresponding to the consecutive symbols $s_j$, $s_{j+1}$, $s_{j+2}$, $s_{j+3}$. In the example shown in FIG. 7, for a trellis stage i, the distance metric $D_i$ is calculated based on another average of distance metrics $D_i$, $D_{i-1}$ and $D_{i+1}$ of adjacent super-symbols $S_{i-1}$, $S_i$, $S_{i+1}$. In this example, the enhanced branch metric calculation implements a super-symbol based TCR processing with N=4, and a branch metric smoothing based on three neighboring super-symbols. According to this example, in each stage of the trellis 400, twelve symbols are involved in one branch metric calculation. It should be noted that other suitable numbers for N and for the number of neighboring symbols (or super-symbols) used for branch metric smoothing can be implemented.

Two alternative hardware implementations of the enhanced branch metric calculation for the super-symbol based TCR processing will now be described.

According to the first implementation, the phase rotator 502 and the slicer 504 may be performed outside the TCR module 350 for all super-symbols. The calculated distance metrics may be buffered and then retrieved by the TCR modules 350. For example, if a sub-frame of 512 symbols are output at the linear equalizer 204, 128 super-symbol distance metrics may be calculated for each phase state $\phi_k$ and buffered to be used appropriately in the BMCU 700 of the TCR module 350.

According to the second implementation, to reduce the size of the buffer, the distance metrics may be calculated on-the-fly and inside the ACSU. A relatively small buffer is typically sufficient to buffer the distance metrics for each phase state $\phi_k$ in one polarization. However, because there may be overlapping symbols for initialization and/or termination of the trellis, some distance metrics may be computed several times separately in the parallel TCR modules 350.

Figure 8:
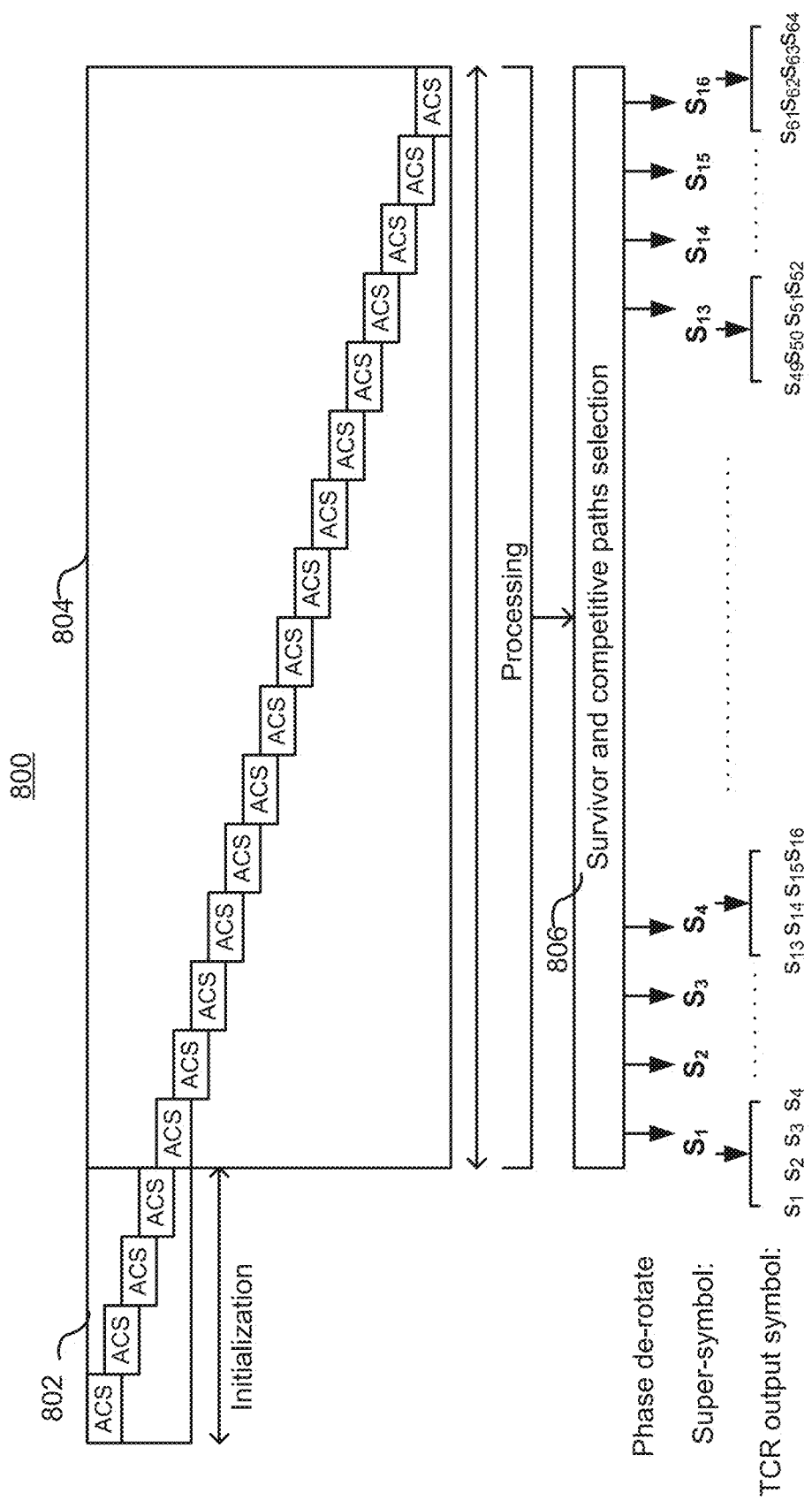
FIG. 8 is a schematic diagram of an embodiment of an enhanced trellis decoding of the TCR module.

FIG. 8 is a schematic diagram of an embodiment of an enhanced trellis decoding illustrating the super-symbol based TCR processing. The enhanced ACSU 800 navigates through a plurality of add-compare-select (ACS) trellis stages including the initialization trellis stages 802 and the processing trellis stages 804. A survived path and competitive paths can be traced 806 using the Viterbi or BCJR algorithm as described above. The obtained survived path and competitive paths can then be used for determining the most likely residual phase noise for each of the super-symbols. The consecutive symbols constructing a super-symbol, e.g., $s_1$, $s_2$, $s_3$, $s_4$, can be compensated uniformly by phase de-rotating the corresponding super-symbol, e.g., $S_1$. As a result, compensated super-symbols are obtained and compensated symbols are produced as output.

According to yet another embodiment of the description, the accuracy of the TCR module 350 may be enhanced by averaging over the survived path and at least one competitive path.

Because the trellis 400 represents the residual phase noise, it is expected that the survived path (the most probable path) and the competitive paths (the second or higher order most probable paths) may be very close to each other. If they are far from each other, then the recovered residual phase noise may not be very reliable. Accordingly, the most likely residual phase noise may be calculated based on the survived path and at least a second most probable path. The performance of the TCR module 350 may be further improved when the most likely residual phase noise is calculated based on a weighted average of the survived path, the second most probable path, and a third most probable path.

The most probable phase is determined by the most probable path traced back from the state having the minimum state metric in the $L^{th}$ trellis stage. The second and third most probable phases are determined by the second and third most probable paths traced back from the states having the second and third minimum state metrics in the $L^{th}$ trellis stage. If an incorrect path is survived due to reasons such as random phase noise jumps, a short TCR trace back length, open trellis ends, etc., the competitive paths can be used to improve the carrier recovery. It should be understood that any suitable number of competitive paths may be used to enhance the performance of the TCR module 350.

According to yet another embodiment, the accuracy of the TCR module 350 may be enhanced by taking into consideration more than one closest constellation point. In the branch metric calculation of the equation (1), finding the closest constellation point (e.g., by the slicer 504) may be a source of error. If a hard decoded symbol is not correct, the error can be propagated to other symbols. To reduce this error propagation, instead of considering only the closest constellation point to the phase-rotated signal, a greater number of closest constellation points to the phase-rotated signal may be used. Mathematically, equation (1) may be modified as:

$$m[l, k, n] = -\ln \sum_{i=1}^{nPoints} \frac{|R[n]e^{j\varphi_k} - \hat{s}_i[n]|^2}{\sigma_N^2} + \frac{|\varphi_k - \varphi_l|^2}{2\sigma_\Delta^2},$$

where nPoints is the number of the constellation points that are closest to $R[n]e^{j\Phi_k}$. For nPoints=1, the above equation is simplified to equation (1). To find the nPoints closest points to the phase-rotated signal, the same slicer LUT 504 may be used. Increasing nPoints can improve the performance, however, the performance may be saturated when nPoints reaches a threshold number. The threshold number may be one for QPSK or 16QAM, and three for 64QAM. Higher order modulation formats may have a higher threshold number. Thus, nPoints=1 and nPoints=3 may be considered as good trade-off numbers between performance and complexity for QPSK/16QAM and 64QAM, respectively. It should be understood that other suitable numbers for nPoints may be used to enhance the performance of the TCR module 350.

It should also be noted that the above enhancements to the TCR module may be used independently, or as combinations, depending on, for example, a particular communication system, a particular modulation scheme, or a particular design consideration.

In addition or as an alternative to the above enhancements, several ways may exist to simplify the implementation of the TCR module 350.

According to one embodiment, phase rotation 502 may be simplified by removing complex number multiplications. A phase is rotated according to $$\begin{bmatrix} I' \\ Q' \end{bmatrix} = \begin{bmatrix} \cos\varphi & -\sin\varphi \\ \sin\varphi & \cos\varphi \end{bmatrix} \begin{bmatrix} I \\ Q \end{bmatrix} = \cos\varphi \begin{bmatrix} 1 & -\tan\varphi \\ \tan\varphi & 1 \end{bmatrix} \begin{bmatrix} I \\ Q \end{bmatrix}.$$

To avoid multiplications, rotation degrees may be simplified as $\phi=\tan^{-1} u2^{-i}$. Then, the tangent multiplication in the phase rotation 502 may be reduced to bit shifting. The cosine multiplication outside the matrix can be performed in the slicer 504. When ω is small, such as in most cases, e.g., 64QAM, cos φ≈1, and the rotation can be reduced to $$\begin{bmatrix} I' \\ Q' \end{bmatrix} = \begin{bmatrix} \cos\varphi & -\sin\varphi \\ \sin\varphi & \cos\varphi \end{bmatrix} \begin{bmatrix} I \\ Q \end{bmatrix} \approx \begin{bmatrix} 1 & -u2^{-i} \\ u2^{-i} & 1 \end{bmatrix} \begin{bmatrix} I \\ Q \end{bmatrix},$$

which is a multiplier free rotation. A multiplier free design of the TCR module 350 may be implemented to reduce hardware resources and implementation complexity based on the above simplification.

According to another embodiment, the branch metric calculation can also be simplified. For simplified branch metric calculation, either of the following approximations may be used:

$$\sqrt{dI^2 + dQ^2} \approx |dI| + |dQ|$$

Or $$\sqrt{dI^2 + dQ^2} \approx \max\{|dI|, |dQ|\} + \frac{1}{2}\min\{|dI|, |dQ|\}$$

Thereby, the branch metric may be simplified as $$m[l,k,n] = |dI| + |dQ| + \text{constant}$$

Or $$m[l, k, n] = \max\{|dI|, |dQ|\} + \frac{1}{2}\min\{|dI|, |dQ|\} + \text{constant},$$

where, $$\begin{cases} dI = I[n] - 2^{-k}Q[n] - \hat{I}[n] \\ dQ = 2^{-k}I[n] + Q[n] - \hat{Q}[n] \end{cases}$$

and $\hat{I}$ and $\hat{Q}$ are the outputs of the slicer 504.

According to yet a further embodiment, for a TCR module 350 with M states, state metrics for M states can be calculated, but a reduced set of fewer than M states are propagated. This can be referred to as trellis state reduction in the trellis decoding methods. Because trellis states represent phases, states that are most likely to be traced back are expected to be adjacent to each other. Therefore, instead of using state metric sorting for the purpose of trellis state reduction (which can be complicated for hardware implementation), the states having the minimum state metrics can be traced in a given trellis stage and a reduced set of states (e.g., M/2 states) can be selected based on the minimum states to be propagated.

Figure 9:
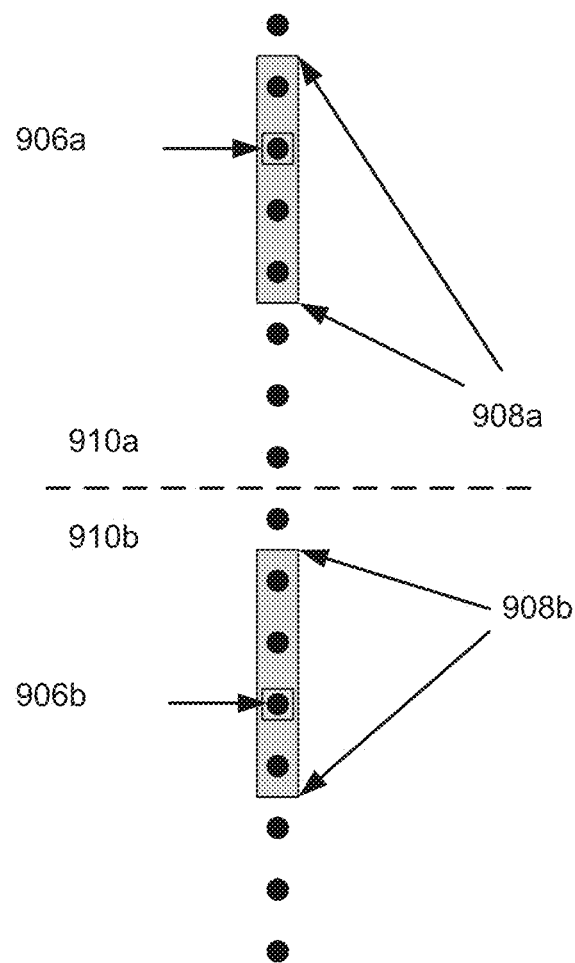
FIG. 9 is an illustration of a trellis state reduction scheme based on two minimum states, according to an embodiment.

FIG. 9 is an example of the trellis state reduction scheme based on two minimum states. According to this example, the trellis states may be divided into two subgroups of consecutive phase states 910a, 910b. In each subgroup 910a, 910b, a phase state with the minimum state metric is selected 906a, 906b. A reduced set of states 908a, 908b based on these two minimum states 906a, 906b (e.g., the M/4 closest phase states from each of these two minimum states 906a, 906b) can be selected for a next stage TCR processing. Using trellis state reduction, the hardware complexity can be reduced with minimal performance degradation.

Figure 10:
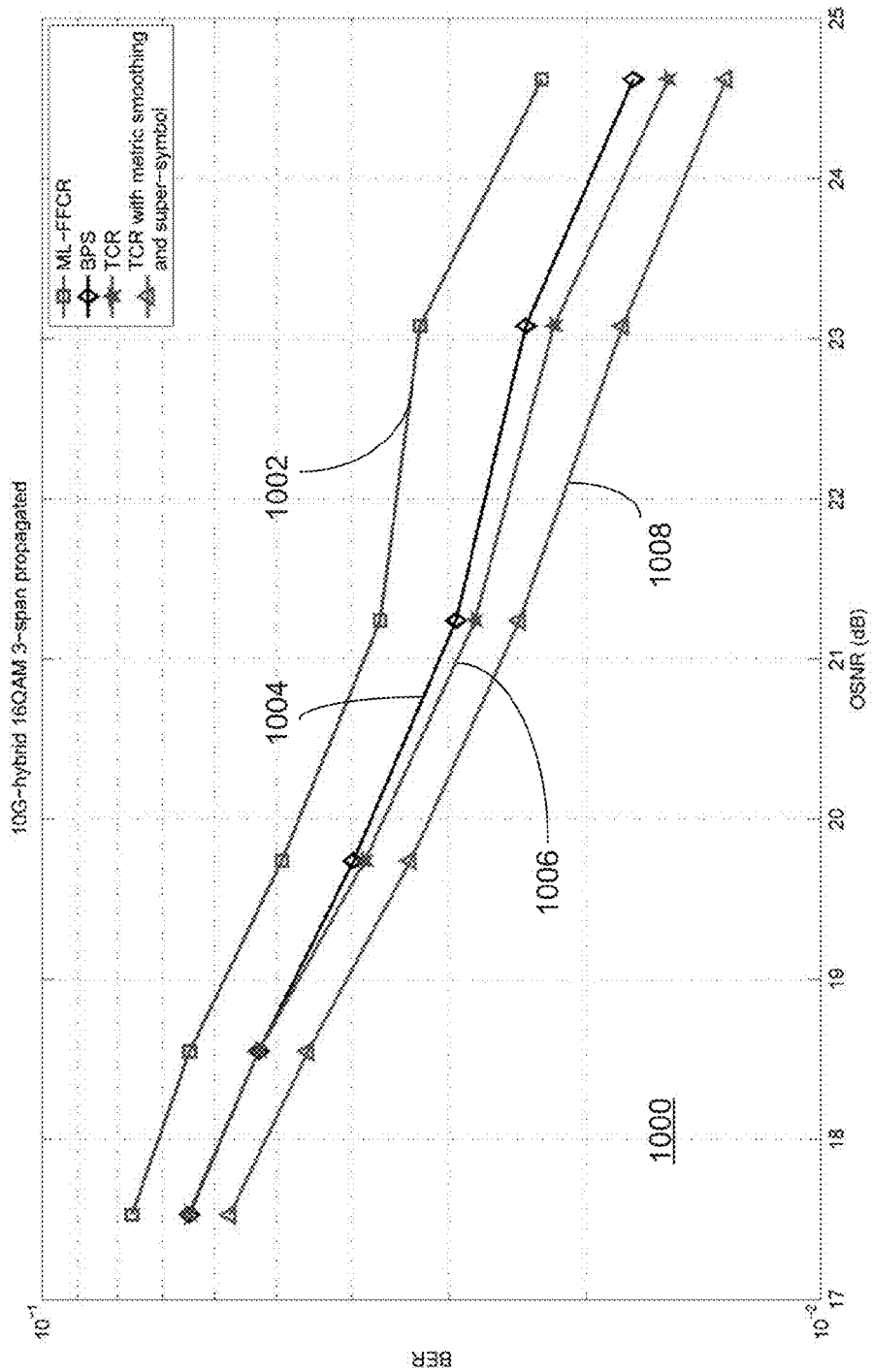
FIG. 10 illustrates bit error rate (BER) versus optical signal-to-noise ratio (OSNR) waterfall curves of a transmission link utilizing embodiments of the TCR method, compared to conventional schemes.

FIG. 10 illustrates bit error rate (BER) versus optical signal-to-noise ratio (OSNR) waterfall curves of a transmission link utilizing embodiments of the trellis-based carrier recovery method, compared to conventional schemes. The results are obtained based on 200G-16QAM co-propagated with 10G channels after three spans. The graph 1000 shows the improved performance of the TCR method disclosed herein 1006 relative to conventional methods such as ML-FFCR 1002 and BPS 1004. The TCR method with branch metric smoothing and with super-symbol processing 1008 provides an even better performance.

Figure 11:
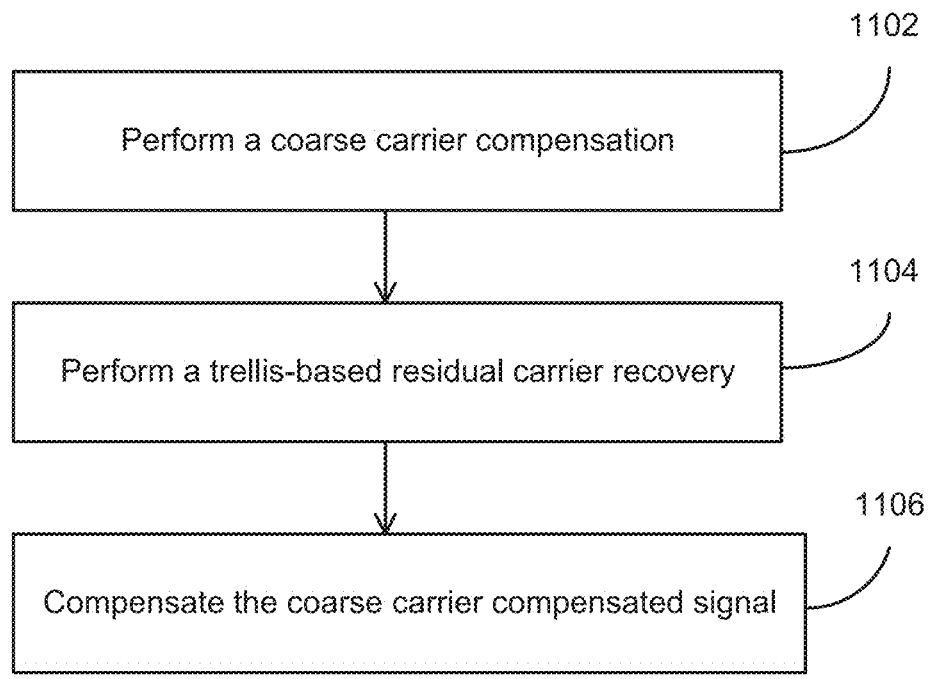
FIG. 11 is a flowchart of a residual carrier recovery method, according to an embodiment.

FIG. 11 is a flowchart of an embodiment of the residual phase recovery method as described above. A coarse carrier compensation or recovery of a received signal is performed (1102) to obtain a coarse carrier compensated signal. The coarse carrier compensation can be realized by a FBCR, a FFCR, or both. A trellis-based residual carrier recovery is then performed (1104) to estimate a residual phase noise of the coarse carrier compensated signal. Finally, the coarse carrier compensated signal is compensated (1108) based on the estimated residual phase noise.

Figure 12:
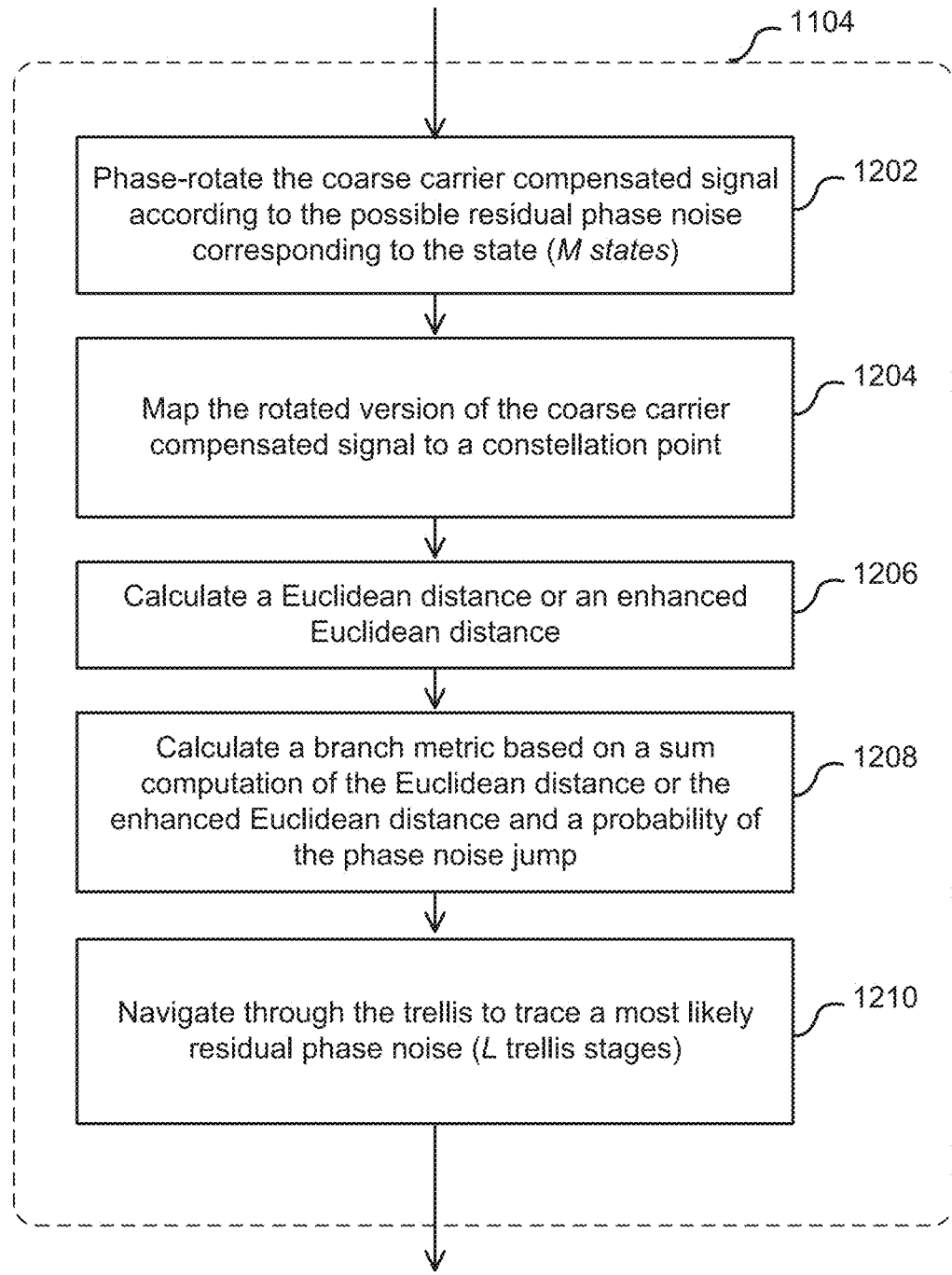
FIG. 12 is a flowchart of performing the TCR method, according to an embodiment.

FIG. 12 is a flowchart of performing (1104) the TCR method, according to an embodiment. As described above, a trellis is constructed comprising L trellis stages (the trace back length of the trellis) and M states corresponding to M possible residual phase noise of a symbol. For each state in the trellis, the coarse carrier compensated signal is phase-rotated (1202) according to the possible residual phase noise corresponding to the state and then mapped (1204) to a constellation point in a modulation constellation of the received modulated signal. A Euclidean distance is calculated (1206) between the phase-rotated coarse carrier compensated signal and the mapped constellation point. The Euclidean distance may be enhanced by averaging over a plurality of neighboring symbols and/or taking into consideration more than one closest constellation point, as described above. As noted above, the term "average" should be understood broadly to also encompass a weighted average. The branch metric is calculated (1208) based on the Euclidean distance or the enhanced Euclidean distance and a probability of the phase noise jump. Based on the calculated branch metrics, the trellis is navigated (1210) through the L trellis stages to trace a most likely residual phase noise. The most likely residual phase noise can also be calculated based on a survived path and at least one competitive path, as described above.

Figure 13:
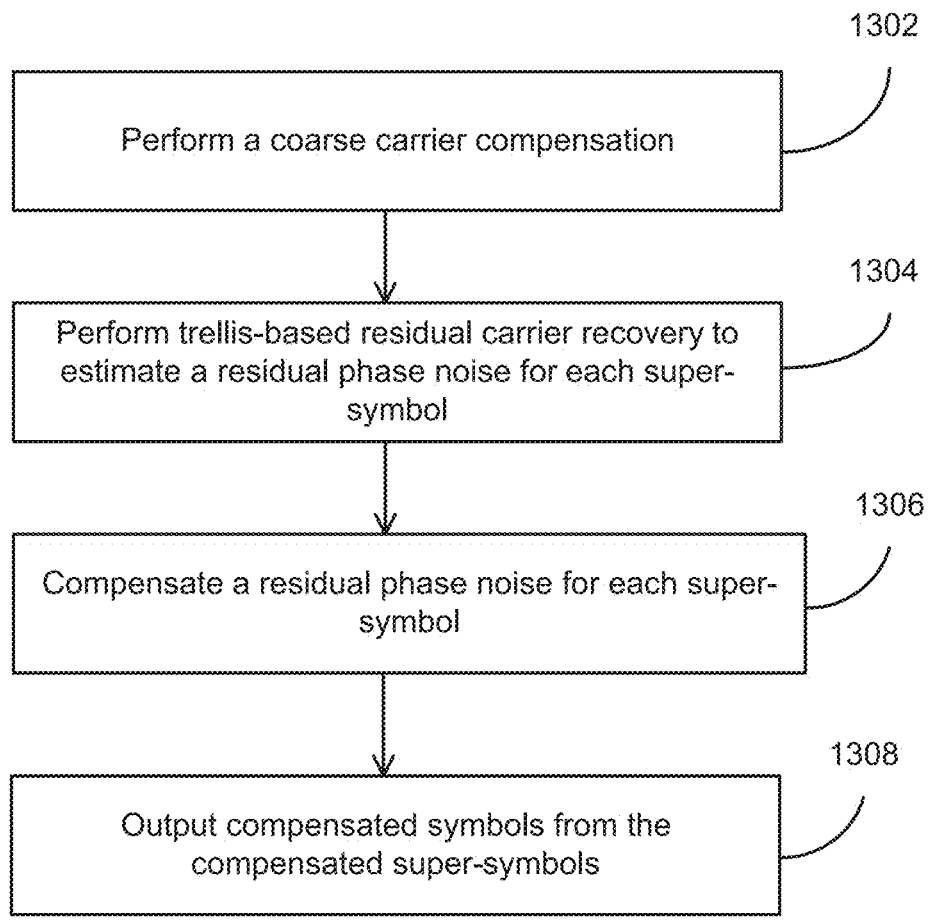
FIG. 13 is a flowchart of a super-symbol based residual carrier recovery method, according to an embodiment.

FIG. 13 is a flowchart of an embodiment of the super-symbol based residual carrier recovery method, as described above. According to the embodiment, a coarse carrier compensation of a received signal is performed (1302) to obtain a coarse carrier compensated signal. Thereafter, a trellis-based residual carrier recovery is performed (1304) to estimate a residual phase noise for each super-symbol, where the plurality of symbols modulated in the received signal is grouped into a plurality of super-symbols and each super-symbol is composed of N consecutive symbols. The estimated residual phase noise of each super-symbol is used as an estimated residual phase noise for each of the consecutive symbols making up the super-symbol. A residual phase noise for each super-symbol is compensated (1306) by phase-de-rotating the coarse carrier compensated signal and the compensated symbols can be output (1308) from the compensated super-symbols.

Figure 14:
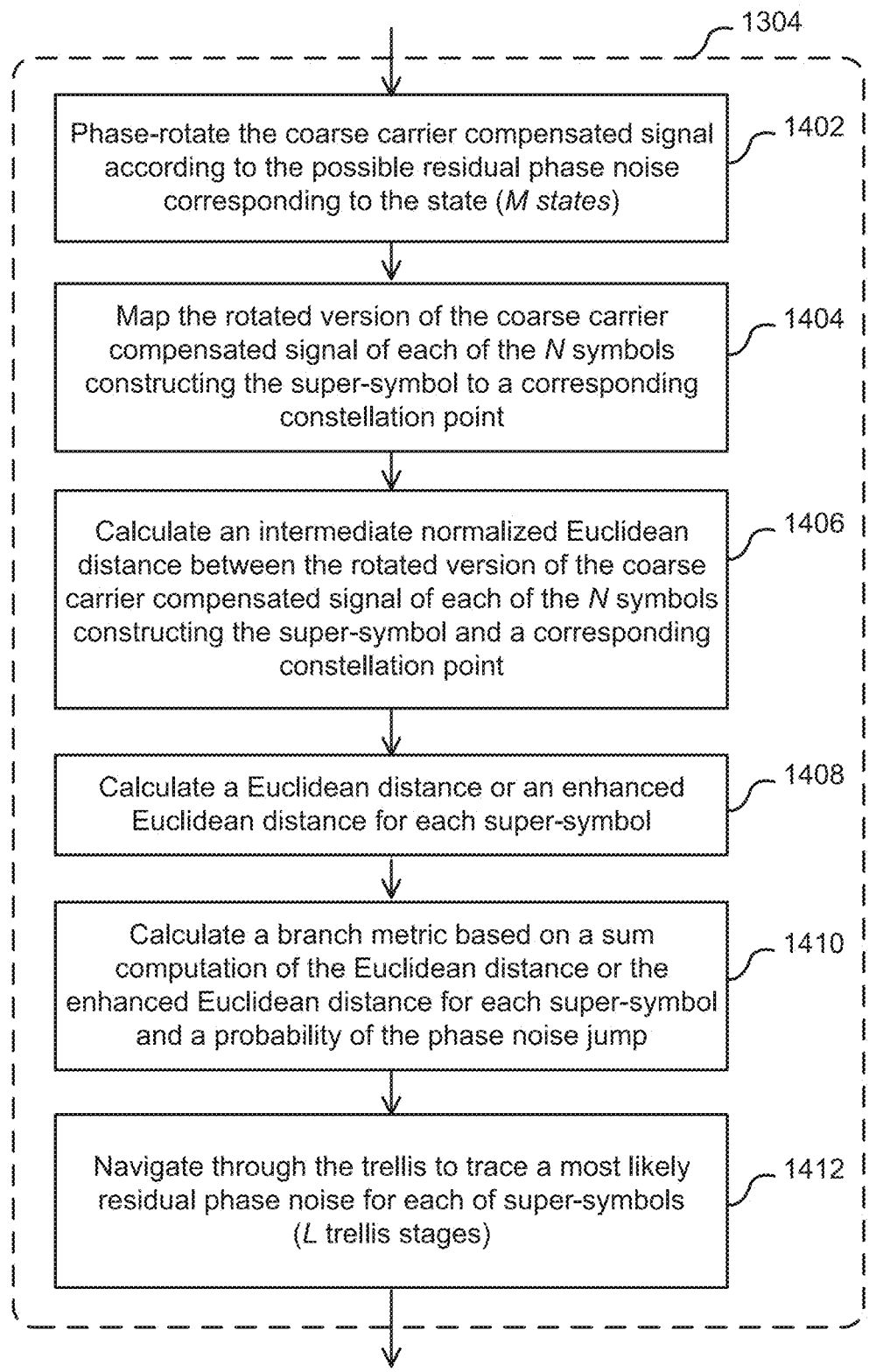
FIG. 14 is a flowchart of performing the super-symbol based TCR method, according to an embodiment.

FIG. 14 is a flowchart of performing (1304) the super-symbol based TCR method, according to an embodiment. As described above, a trellis is constructed comprising L trellis stages (the trace back length of the trellis) and M states corresponding to M possible residual phase noise of a super-symbol. For each of the N symbols making up the super-symbol, the coarse carrier compensated signal is phase-rotated (1402) according to the possible residual phase noise corresponding to the state. The phase-rotated coarse carrier compensated signal of each of the N symbols is then mapped (1404) to a corresponding constellation point. An intermediate normalized Euclidean distance is calculated (1406) between the phase-rotated coarse carrier compensated signal of each of the N symbols making up the super-symbol and the corresponding constellation point. A Euclidean distance for each super-symbol is calculated (1408) by calculating an average of the intermediate normalized Euclidean distances. The Euclidean distance may be enhanced by averaging over a plurality of neighboring symbols and/or taking into consideration more than one closest constellation point, as described above. As noted above, the term "average" should be understood broadly to also encompass a weighted average. A branch metric is calculated (1410) based on a sum computation of the Euclidean distance or the enhanced Euclidean distance and a probability of the phase noise jump. Based on the obtained branch metric, the trellis can be navigated (1412) through the L trellis stages to trace a most likely residual phase noise for each of the super-symbols.

It should be noted that the TCR module 350 and processing method can be applied to various modulation schemes (Binary Phase-shift Keying (BPSK), QPSK, 8QAM, 16QAM, etc.). The TCR module 350 and TCR processing method can also work with pre-coding, pre-compensations, quantization, and different sources of noise (e.g., Amplified Spontaneous Emission (ASE), phase noise, etc.). Although a PDM system is illustrated in the examples, it should be noted that the TCR module 350 and TCR processing method can also be used in single-polarization coherent optical transmission. As well, although some embodiments are described with reference to optical systems and particularly coherent optical systems, it should be understood that the described methods and apparatuses are generally applicable to any communication systems.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments and is not intended to limit the scope of the claims.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of residual carrier recovery of a received modulated signal performed by a digital signal processing apparatus implemented at least partially in hardware, the method comprising:
    performing a coarse carrier compensation of the received modulated signal to obtain a coarse carrier compensated signal;
    performing a trellis-based residual carrier recovery to estimate a residual phase noise of the coarse carrier compensated signal; and
    compensating the coarse carrier compensated signal based on the estimated residual phase noise, wherein performing the trellis-based residual carrier recovery comprises:
    constructing a trellis comprising L trellis stages and M states corresponding to M possible residual phase noise values of the coarse carrier compensated signal; and
    traversing the L trellis stages of the trellis to trace a most likely residual phase noise as the residual phase noise of the coarse carrier compensated signal.

2. The method as defined in claim 1 wherein the most likely residual phase noise is calculated based on a survived path and at least one competitive path, wherein the survived path is traced back from a state of a state metric having an extremal value in a $L^{th}$ trellis stage, and the competitive path is traced back from a state of a state metric having a second or higher order extremal value in the $L^{th}$ trellis stage.

3. The method as defined in claim 1, wherein the received modulated signal comprises a plurality of symbols and performing the trellis-based residual carrier recovery further comprises:
    grouping the plurality of symbols into a plurality of super-symbols, each super-symbol being made up of a group of consecutive symbols; and
    performing a residual carrier recovery to estimate a residual phase noise for each of the super-symbols, the estimated residual phase noise of each super-symbol being used as an estimated residual phase noise for each of the consecutive symbols making up the super-symbol.

4. The method as defined in claim 1, wherein constructing the trellis further comprises, for each state in the trellis,
    phase-rotating the coarse carrier compensated signal according to the possible residual phase noise corresponding to the state to obtain a phase-rotated signal;
    mapping the phase-rotated signal to a constellation point in a modulation constellation of the received modulated signal;
    calculating a normalized Euclidean distance between the phase-rotated signal and the constellation point;
    calculating a probability of a phase noise jump corresponding to a branch leading to the state; and
    calculating a branch metric of the branch based on a sum computation of the normalized Euclidean distance and the probability of the phase noise jump.

5. The method as defined in claim 4, wherein the received modulated signal is modulated with a plurality of symbols and the plurality of symbols is grouped into a plurality of super-symbols, each super-symbol being made up of a group of N consecutive symbols, and calculating the normalized Euclidean distance further comprises:
   calculating an intermediate normalized Euclidean distance between the phase-rotated signal of each of the N symbols making up the super-symbol and a corresponding constellation point; and
   calculating an average of the calculated intermediate normalized Euclidean distances.

6. The method as defined in claim 5, wherein calculating the average comprises calculating a weighted average.

7. The method as defined in claim 4, wherein the calculated normalized Euclidean distance is averaged over a plurality of neighboring symbols.

8. The method as defined in claim 5, wherein the calculated normalized Euclidean distance is averaged over a plurality of neighboring super-symbols.

9. The method as defined in claim 4, wherein calculating the normalized Euclidean distance between the phase-rotated signal and the constellation point further comprises:
   calculating an intermediate normalized Euclidean distance between the phase-rotated signal and each of a plurality of constellation points closest to the phase-rotated signal; and
   calculating the normalized Euclidean distance based on the calculated intermediate normalized Euclidean distances.

10. The method as defined in claim 1, wherein the possible residual phase noises corresponding to the states of the trellis have uniformly distributed values.

11. The method as defined in claim 1, wherein the possible residual phase noises corresponding to the states of the trellis have uniformly distributed arctan values.

12. The method as defined in claim 1, wherein the residual carrier recovery is performed in a dual-polarized coherent optical system and performing the trellis-based residual carrier recovery comprises estimating a residual phase noise of each of two orthogonal polarizations of the coarse carrier compensated signal separately.

13. The method as defined in claim 12, wherein performing the trellis-based residual carrier recovery comprises:
   calculating a first estimated residual phase noise of a first polarization of the coarse carrier compensated signal and a second estimated residual phase noise of a second polarization of the coarse carrier compensated signal; and
   estimating the residual phase noise of the coarse carrier compensated signal based on an average of the first and the second estimated residual phase noises.

14. The method as defined in claim 1, wherein the trellis-based residual carrier recovery is configured to propagate the trellis from a trellis stage to a next trellis stage based on a reduced set of states, wherein the reduced set of states in each stage is selected based on state metric values.

15. A digital signal processing apparatus implemented at least partially in hardware, the digital signal processing apparatus comprising:
   a coarse carrier recovery module for performing a coarse carrier compensation of a received modulated signal; and
   a trellis-based processing module for estimating and compensating a residual phase noise of the received modulated signal,
   wherein the trellis-based processing module is configured to utilize a trellis comprising L trellis stages and M states corresponding to M possible residual phase noise values of a received symbol, and wherein the trellis-based processing module is configured to traverse the trellis to trace a most likely residual phase noise as the residual phase noise of the received modulated signal.

16. The digital signal processing apparatus as defined in claim 15, wherein each state of the trellis representing a possible residual phase noise of a super-symbol and each super-symbol being made up of N consecutive symbols, and wherein the trellis-based processing module is configured to traverse the trellis to trace a most likely residual phase noise for each super-symbol.

17. The digital signal processing apparatus as defined in claim 15, wherein the trellis-based processing module is configured to, for each state in the trellis,
   phase-rotate an output of the coarse carrier recovery module according to the possible residual phase noise corresponding to the state;
   map the phase-rotated output of the coarse carrier recovery module to a constellation point in a modulation constellation of the received modulated signal;
   calculate a normalized Euclidean distance between the phase-rotated output of the coarse carrier recovery module and the constellation point;
   calculate a probability of a phase noise jump corresponding to a branch leading to the state; and
   calculate a branch metric of the branch based on a sum computation of the normalized Euclidean distance and the probability of the phase noise jump.

18. The digital signal processing apparatus as defined in claim 17, wherein the received modulated signal comprises a plurality of symbols and the plurality of symbols is grouped into a plurality of super-symbols, a super-symbol being made up of N consecutive symbols, and calculating the normalized Euclidean distance further comprises:
   calculating an intermediate normalized Euclidean distance between the phase-rotated output of the coarse carrier recovery module of each of the N symbols making up the super-symbol and a corresponding constellation point; and
   calculating an average of the calculated intermediate normalized Euclidean distances.

19. The digital signal processing apparatus as defined in claim 18, wherein the average of the calculated intermediate normalized Euclidean distances is a weighted average.

20. The digital signal processing apparatus as defined in claim 17, wherein the calculated normalized Euclidean distance is averaged over a plurality of neighboring symbols.

21. The digital signal processing apparatus as defined in claim 18, wherein the calculated normalized Euclidean distance is averaged over a plurality of neighboring super-symbols.

22. The digital signal processing apparatus as defined in claim 17, wherein calculating the normalized Euclidean distance further comprises:
   calculating an intermediate normalized Euclidean distance between the phase-rotated output from the coarse carrier recovery module and each of a plurality of constellation points closest to the phase-rotated output from the coarse carrier recovery module; and
   calculating the normalized Euclidean distance based on the calculated intermediate normalized Euclidean distances.

23. The digital signal processing apparatus as defined in claim 15, wherein the most likely residual phase noise is calculated based on a survived path and at least one competitive path, wherein the survived path is traced back from a state of a state metric having an extremal value in a $L^{th}$ trellis stage, and the competitive path is traced back from a state of a state metric having a second or higher order extremal value in the $L^{th}$ trellis stage.

24. The digital signal processing apparatus as defined in claim 15, wherein the possible residual phase noises corresponding to the states of the trellis have uniformly distributed values.

25. The digital signal processing apparatus as defined in claim 15, wherein the possible residual phase noises corresponding to the states of the trellis have uniformly distributed arctan values.

26. The digital signal processing apparatus as defined in claim 15, wherein the digital signal processing apparatus is an optical digital signal processing apparatus used in a dual-polarized coherent optical system, and the trellis-based processing module is further configured to estimate a residual phase noise of each of two orthogonal polarizations of the received modulated signal separately.

27. The digital signal processing apparatus as defined in claim 26, wherein the trellis-based processing module is further configured to:
  calculate a first estimated residual phase noise of a first polarization of the received modulated signal and a second estimated residual phase noise of a second polarization of the received modulated signal; and
  estimate the residual phase noise of the received modulated signal based on an average of the first and the second estimated residual phase noises.

28. The digital signal processing apparatus as defined in claim 15, wherein the trellis-based processing module is configured to propagate the trellis from a trellis stage to a next trellis stage based on a reduced set of states, wherein the reduced set of states in each stage is selected based on state metric values.

* * * * *

UNITED STATES PATENT AND TRADEMARK OFFICE
CERTIFICATE OF CORRECTION

PATENT NO. : 9,537,683 B1  
APPLICATION NO. : 14/876246  
DATED : January 3, 2017  
INVENTOR(S) : Mahdi Zamani et al.

It is certified that error appears in the above-identified patent and that said Letters Patent is hereby corrected as shown below:

In the Specification

Description, Column 4, Lines 3-4: "fiber non-linearity, large laser line-width" should be "fiber non-linearity, or large laser line-width".

Description, Column 5, Line 49: "$(l = 1, ... , K, K = 1, ... , M, n = 1, ... , L)$" should be "$(l = 1, ... , K, k = 1, ... , M, n = 1, ... , L)$".

Description, Column 7, Lines 18-19: "coarse carrier recovery module 206" should be "coarse carrier recovery module 210".

Description, Column 9, Lines 26-27: "128 super-symbol distance metrics" should be "128 super-symbol distance metrics".

Description, Column 11, Line 2: "When co is small" should be "When φ is small".

Signed and Sealed this  
Twenty-fifth Day of April, 2017

Michelle K. Lee  
*Director of the United States Patent and Trademark Office*